United States Patent [19]

Miyano

[11] Patent Number: 4,564,431

[45] Date of Patent: Jan. 14, 1986

[54] TW-ELECTROEROSION MACHINES WITH DOUBLE-FLOATING NOZZLE ASSEMBLIES

[75] Inventor: Kazuyoshi Miyano, Yokohamashi, Japan

[73] Assignee: Inoue-Japax Research Incorporated, Japan

[21] Appl. No.: 660,865

[22] Filed: Oct. 11, 1984

[30] Foreign Application Priority Data

Oct. 11, 1983 [JP] Japan .................... 58-189538

[51] Int. Cl.$^4$ .............................. C25D 17/00
[52] U.S. Cl. ..................... 204/224 M; 204/225; 204/206; 219/69 W
[58] Field of Search ............ 204/224 M, 225, 206; 219/69 W

[56] References Cited

U.S. PATENT DOCUMENTS

| 3,075,903 | 1/1963 | Costa et al. | 204/224 M |
| 3,293,166 | 12/1966 | Cowing | 204/224 M |
| 4,481,095 | 11/1984 | Inoue | 204/224 M |

FOREIGN PATENT DOCUMENTS

| 3310995 | 3/1982 | Fed. Rep. of Germany | 204/224 M |
| 3303644 | 11/1982 | Fed. Rep. of Germany | 204/224 M |
| 57-102725 | 6/1982 | Japan | 204/224 M |
| 57-89526 | 6/1982 | Japan | 204/224 M |

Primary Examiner—R. L. Andrews

Attorney, Agent, or Firm—Finnegan, Henderson, Farabow, Garrett & Dunner

[57] ABSTRACT

An inner movable nozzle and an outer movable nozzle are slidably supported by a hollow base member having a first and a second internal fluid passage flooded with a pressurized machining liquid medium in a first and a second inlet flow, respectively. The inner nozzle is constituted by a first hollow body surrounding a traveling electrode and ending with an outlet portion forming a first annular face adjacent the workpiece and defining a principal nozzle orifice for discharging the liquid medium of the first flow about the electrode. The hollow body is movably supported by the base member so as to be thrusted outwards thereof to urge the outlet portion towards engagement with the workpiece against pressure in constituted fluid passages created outside the principal nozzle orifice and defined with the workpiece. The outer movable nozzle is constituted by a second hollow body surrounding the first hollow body so to be movable independently thereof and ending with an outlet portion forming a second annular face adjacent the workpiece and defining with the first-mentioned outlet portion an annular, auxiliary nozzle orifice for discharging the liquid medium of the second inlet flow about the liquid medium being discharged through the principal nozzle orifice. The second hollow body is supported by the base member so as to be thrustable outwards thereof to urge the second annular face towards engagement with the workpiece against pressure of the discharged liquid medium flowing between the second annular face and the workpiece.

2 Claims, 2 Drawing Figures

TW-ELECTROEROSION MACHINES WITH DOUBLE-FLOATING NOZZLE ASSEMBLIES

FIELD OF THE INVENTION

The present invention relates to electroerosion and, more particularly, to electroerosion machines having improved fluid delivery assemblies.

BACKGROUND OF THE INVENTION

The term "electroerosion" is used herein to refer to a machining process in which electric energy is supplied across a machining gap formed between a tool electrode and a conductive workpiece and flushed with a machining fluid to remove material from the workpiece by the action of successive time-spaced electrical discharges effected across the gap (electrical discharge machining or EDM), the action of electrochemical or electrolytic solubilization (electrochemical machining or ECM) or a combination of these actions (electrochemical-discharge machining or ECDM). In EDM, the machining fluid is commonly a liquid which is basically electrically nonconductive or of dielectric nature and typically constituted by deionized water, a liquid hydrocarbon or a combination of such water and hydrocarbon. The electric energy is supplied commonly in the form of a succession of voltage pulses which result in a corresponding succession of pulsed, discrete electrical discharges across the machining gap. In ECM, the machining fluid is commonly a liquid electrolyte which is naturally conductive, and the machining current may be a direct current but is preferably in the form of pulses or pulsating current. In ECDM, the machining fluid is typically a liquid having both dielectric and electrolytic natures and may be tap water or water deionized to retain weak conductivity.

In traveling-wire (TW) electroerosion, the tool electrode is constituted by a continuous electrode element which is typically a conductive wire having a diameter ranging from 0.05 mm to 0.5 mm, but may take the form of a tape or ribbon of similar thickness. Such electrode is broadly and generally referred to herein as a wire or wire-like electrode. The wire electrode is axially transported continuously along a given continuous guide path from a supply to a takeup through a cutting zone in which a workpiece is disposed. The cutting zone is commonly defined by a pair of cutting guide members which support the traveling wire across the workpiece. Wire traction and braking means allow the continuous wire to be tightly stretched and kept taut between the supply and the takeup and to be axially driven between the cutting guide members while traversing the workpiece, thus presenting the continuously renewed electrode surface juxtaposed in an electroerosive cutting relationship with the workpiece across a narrow cutting gap. The cutting gap is flushed with a cutting liquid medium and electrically energized with a high-density electrical machining current which is passed between the wire electrode and the workpiece to electroerosively remove material from the latter.

The workpiece may be immersed in a bath of the cutting liquid medium which serves to flush the cutting zone. Conveniently, however, the cutting zone is typically disposed in the air or usual environment. One or two nozzles of the conventional design disposed at one or both sides of the workpiece have been utilized to deliver the cutting liquid medium to the cutting gap. The cutting liquid is conveniently water which is deionized or ionized to a varying extent to serve as a desired electroerosive cutting medium. It has been recognized that the roles of the cutting liquid medium in the electroerosive process are to carry the erosive machining current, to carry away the cutting chips and other gap products, and to cool the traveling, thin wire electrode and the workpiece.

To advance the electroerosive material removal in the workpiece, the latter is displaced relative to the wire electrode transversely to the axis thereof. This allows the traveling wire electrode to advance translationally in the workpiece and consequently a narrow cutting slot to be progressively formed behind the advancing wire electrode, the slot having a width slightly greater than the diameter of the wire electrode. The continuous relative displacement along a precision-programmed path results in the formation of a desired contour corresponding thereto and subtly defined by this cutting slot in the workpiece.

Higher cutting speed is an ever increasing demand in the process described. It is, of course, desirable that higher cutting speed be obtained without loss of cutting accuracy. The cutting speed, typically expressed in $mm^2/min$, is defined by the product of the workpiece thickness and the length of cut achieved per unit time along a given cutting course and hence is, for a given workpiece thickness, dependent upon the rate of translational advance of the wire electrode that can be increased. If the rate of advance happens to exceed an actual rate of material removal which not only preset cutting parameters that govern, inter alia, the cutting accuracy but variable prevailing cutting conditions allow, the fine wire breaks so that the cutting operation must be suspended. The goal of higher cutting speed is, therefore, dependent on how ideally optimum conditions in the cutting gap may be established and with stability maintained against instantaneous changes. Among other factors which govern these conditions, it will be noted that adequate flushing is of particular importance.

It is desirable that the cutting gap defined between the traveling, thin wire electrode and the workpiece be kept flushed with a sufficient volume of the cutting liquid and traversed thereby at a sufficient rate to allow the electroerosive action to continue with stability, the cutting chips and other gap products to be carried away promptly and the wire electrode subject to erosive heating to be cooled with effectiveness. Thus, the art has seen various improvements in the structure of fluid-delivery nozzles and the manner of supplying the liquid medium into the cutting zone. It has been observed, however, that they are no more than practical and far less than ideal. At best, some of them are only satisfactory to substantially increase the cutting speed when the workpiece is relatively thin. Greater the workpiece thickness, more difficult it is to maintain the same cutting speed as attainable for thinner workpieces.

OBJECTS OF THE INVENTION

Accordingly, the present invention seeks to provide an improvement in traveling-wire (TW) electroerosive machines encountered in the prior art, and to provide improved TW electroerosion machines with improved fluid delivery nozzle assemblies which allow electrically conductive workpieces to be machined with stability at a cutting speed higher than that attainable heretofore and with a cutting accuracy comparable to or even higher than that practical heretofore.

SUMMARY OF THE INVENTION

According to the present invention there is provided an electroerosion machine having a pair of fluid delivery assemblies disposed at opposite sides of a conductive workpiece traversed by an axially traveling wire-like electrode for discharging a machining liquid medium along the electrode into a machining zone in the workpiece, at least one of which assemblies comprises: a hollow base member having a first and second internal fluid passage traversed by a first and a second pressurized inlet flow of the liquid medium, respectively; an inner movable nozzle constituted by a first movable hollow body supported by the base member so as to surround the traveling electrode and ending with an outlet portion forming a first annular face adjacent the workpiece and defining a principal nozzle orifice for discharging the liquid medium of the first inlet flow about the electrode into constricted fluid flow passages defined around the electrode adjacent the machining zone, said first hollow body being movably supported by said base member so as to be thrustable outwards thereof under pressure of the liquid medium flowing through the first internal fluid passage to urge the first annular face towards engagement with the workpiece against pressure of the discharged liquid medium flowing through the constricted flow passages; and an outer movable nozzle constituted by a second movable hollow body supported by the base member so as to be movable independently of the first hollow body and to surround the first hollow body and ending with an outlet portion forming a second annular face adjacent the workpiece and defining with the first-mentioned outlet portion an annular, auxiliary nozzle orifice for discharging the liquid medium of the second inlet flow about the liquid medium being discharged through the principal nozzle orifice, the second hollow body being supported by the base member so as to be thrustable outwards thereof to urge the second annular face towards engagement with the workpiece against pressure of the discharged liquid medium flowing between the second annular face and the workpiece. Preferably, the electrode is axially advanced through the workpiece from up to down and said at least one assembly includes the assembly disposed at the lower side of the workpiece.

BRIEF DESCRIPTION OF THE DRAWING

These features of the present invention as well as advantages thereof will become more readily apparent from the following description when taken with reference to the accompanying drawings in which.

SPECIFIC DESCRIPTION

Figure 1:
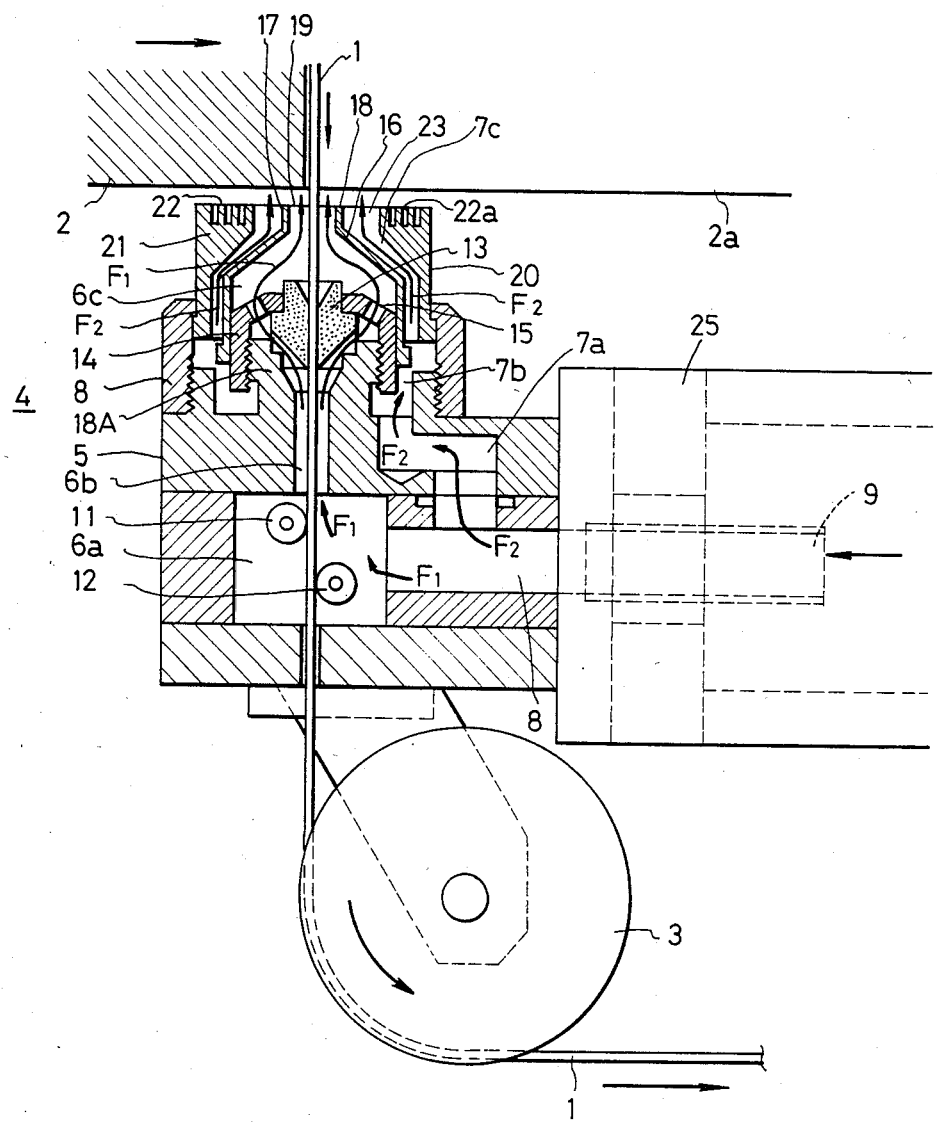
FIG. 1 is an elevational view in section, diagrammatically illustrating a fluid delivery nozzle assembly embodying the present invention.
Figure 2:
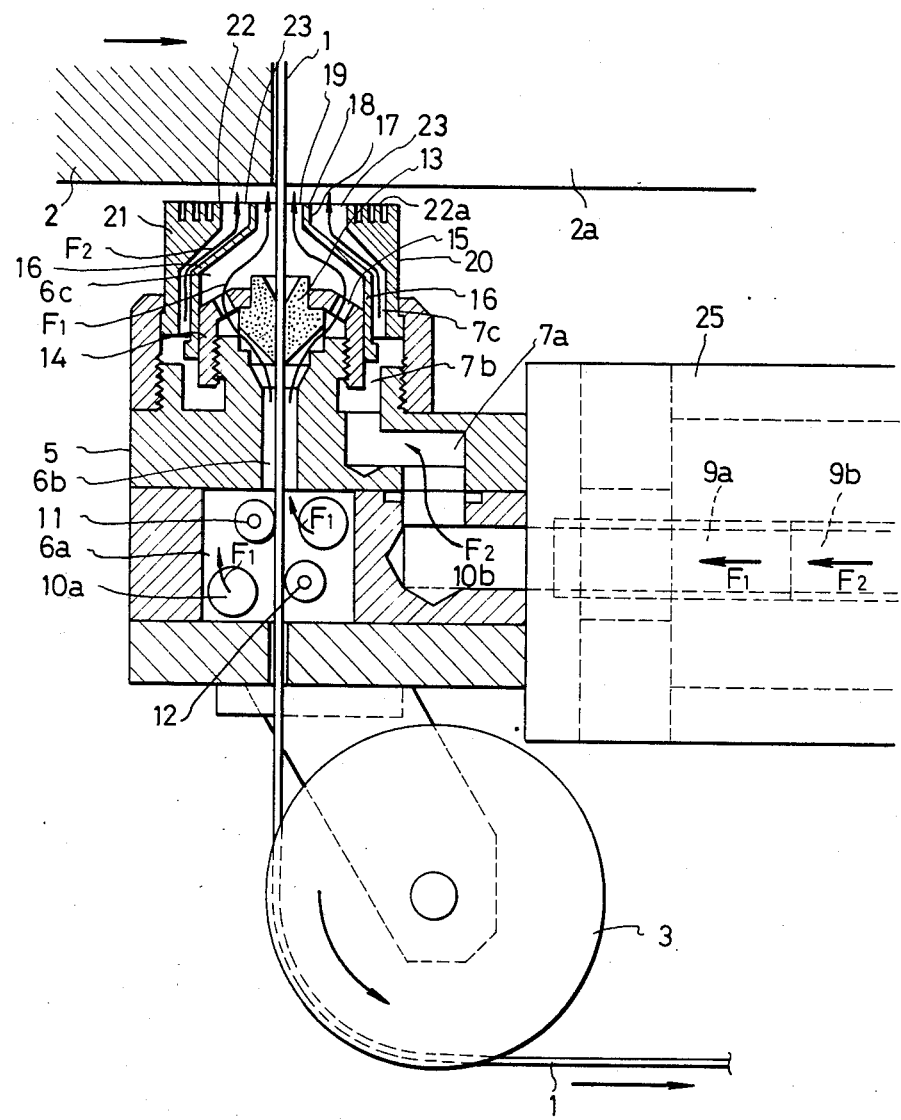
FIG. 2 is a similar view illustrating a modification of the embodiment of FIG. 1.

Referring now to FIGS. 1 and 2, a wire electrode 1 is shown as vertically traveling from up to down to traverse a conductive workpiece 2 which is shown as lying on a horizontal plane. The electrode 1 is dispensed from a supply reel (not shown) to advance over an upper guide roller (not shown), to move through the workpiece 2 and to advance over a lower guide roller 3 for takeup onto a takeup reel (not shown) in a standard TW-EDM arrangement. The standard arrangement also makes use of a pair of fluid delivery assemblies disposed at opposite sides of the workpiece 2 for discharging a machining liquid medium, e.g. deionized water, along the electrode into a machining zone defined in the workpiece 2. The traveling electrode 1 and the workpiece 2 are electrically energized by a power supply (not shown) to electroerosively remove material from the workpiece 2 in the machining zone flushed with the liquid medium delivered from such assemblies. As material removal proceeds, the workpiece 2 is displaced relative to the traveling electrode 1 in the horizontal plane along a programmed cutting path to progressively develop a cutting slot 2a behind the traveling electrode 1 in the workpiece 2, the slot having a width slightly greater than the thickness or diameter of the electrode 1. It is desirable that cutting continue with maximum efficiency which requires erosion stability to be optimized. To this end, among other factors affecting the cutting efficiency in the TW electroerosion process, it has been found that stabilized delivery of the machining medium into and adjacent the machining zone is particularly important.

In the arrangements illustrated, a lower fluid delivery assembly 4 is shown to embody the present invention. The improved assembly 4 comprises a hollow base member 5 having a first series of internal passages 6a, 6b, 6c traversed by a first pressurized inlet flow F1 of the liquid medium and a second series of internal passages 7a, 7b, 7c traversed by a second pressurized inlet flow F2 of the liquid medium. The parallel flows F1 and F2 are diverted into from a single flow with a predetermined inlet pressure and volume flow rate at a common inlet port 8 which communicates via a conduit 9 with a single source (not shown) in the arrangement of FIG. 1. In the arrangement of FIG. 2, the two flows F1 and F2 each with a predetermined inlet pressure and volume flow rate are separately introduced via two separate conduits 9a and 9b from two separate sources (not shown), respectively. The first flow F1 led through the conduit 9a is introduced via ports 10a into the passage 6a in the form of a chamber in which pins 11, 12 are arranged to guide and electrically energize the traveling electrode 1. The second flow f2 led through the conduit 9b is introduced via a port 10b into the passage 7a. The pins 11, 12 are also shown in the embodiment of FIG. 1.

An apertured guide member 13 with a precision-guide aperture slidably receiving the traveling electrode 1 is secured in position above the narrow wire and fluid passage 6b by means of a centrally bored cap 14 which is here designed to form a portion of the base member 5. The cap 14 is also formed around the guide member 13 with a plurality of openings 15 for admitting the flow F1 therethrough.

A first hollow body 16 constituting an inner movable nozzle is, in the illustrated embodiments, slidably fitted onto the cap 14 so as to surround the traveling electrode 1 and has an end or outlet portion 17 forming an annular, face 18 and defining a principal nozzle orifice 19 for discharging the liquid medium of the first flow F1 about the electrode 1. The hollow body 16 slidably retained on the cap 14 is slidingly thrusted outwards of the hollow base member 5 under pressure of the liquid medium flowing through the passage 6a, 6b, 6c. The passage 6c is defined by the inner wall 16a of the hollow body 16 to urge its end portion 17 and the annular face 18 towards engagement with the workpiece 2.

A second hollow body 20 constituting an outer movable nozzle is also slidably retained with the hollow base member 5 and is arranged to surround the first hollow body 16 coaxially therewith about the traveling electrode 1. The second hollow body 20 has an end or outlet portion 21 forming a second annular face 22 and defining with the outlet portion 17 of the inner hollow body 16, an annular, auxiliary nozzle orifice 23 for discharging the liquid medium of the second inlet flow F2 about the liquid medium of the first flow F1 being discharged through the principal nozzle orifice 19. The second annular face 22 is here greater in area than the first annular face 21 and is preferably formed with labyrinthian grooves 22a to stabilize the discharged liquid medium flowing radially outwardly about the electrode 1. The hollow body 20 slidably retained with the base member 5 is slidingly thrusted outwards thereof under pressure of the liquid medium flowing through the passages 7a, 7b, 7c. The passage 7c is defined between the first and second hollow bodies 16 and 20.

The base member 5 is mounted on a horizontal arm 25 which may extend, say, from a vertical column (not shown) of the standard machine. The arm 25 is movable vertically to adjust the vertical position of the base member 5 so as to locate the annular faces 18 and 22 of the inner and outer nozzles in their inactive states below the lower surace of the workpiece 2 at a distance less than a full sliding stroke of the hollow bodies 16 and 20 with respect to the base member 5. In the active positions of the inner and outer nozzles, the hollow members 16 and 20 are, both and independently of each other, thrusted outwards of the base member 5 to bring their outlet portions 17 and 21 adjacent the workpiece 2. Thus, in addition to the narrow cutting slot 2a there are created highly constricted fluid flow passages adjacent the liquid discharge zones between the annular faces 18 and 22 and the workpiece 2. The liquid medium discharged through the principal nozzle orifice 19 results in a stream moving upwards into the cutting slot 2a and as an envelop flow surrounding the electrode into the machining zone. The tendency for that discharged liquid medium to flow radially outwards about the electrode 1 is effectively impeded by the annular flow F2 discharged through the auxiliary nozzle orifice 23. Moreover, the latter discharged liquid medium effectively isolates the machining stream into the cutting zone preventing the environmental air from being entrapped therein. Thus, not only is the inner hollow body 16 slidingly thrusted outwards under the pressure of the inlet liquid flow F1 to urge the outlet portion 17 towards engagement with the workpiece 2 against the pressure of the discharged liquid flowing through the constricted passages, but also the outer hollow body 20 is slidably thrusted outwards under the pressure of the inlet flow F2 to urge the outlet portion 21 towards engagement with the workpiece 2 against the pressure of the discharged liquid flowing between the outer annular face 22 and the workpiece 2. Accordingly, a high favorable pressure equibrium state is established adjacent the machining zone to optimize the mode of delivery of the machining medium therein.

What is claimed is:

1. An electroerosion machine having a pair of fluid delivery assemblies disposed at opposite sides of a conductive workpiece traversed by an axially traveling wire-like electrode for discharging a machining liquid medium along the electrode into a machining zone in the workpiece, at least one of the assemblies comprising:

a hollow base member having a first and second internal fluid passage traversed by a first and a second pressurized inlet flow of the liquid medium, respectively;

an inner movable nozzle constituted by a first movable hollow body supported by said base member so as to surround the traveling electrode and ending with an outlet portion forming a first annular face adjacent the workpiece and defining a principal nozzle orifice for discharging the liquid medium of said first inlet flow about the electrode into constricted fluid flow passages defined around the electrode adjacent the machining zone, said first hollow body being movably supported by said base member so as to be thrustable outwards thereof under pressure of the liquid medium flowing through said first internal fluid passage to urge said first annular face towards engagement with the workpiece against pressure of the discharged liquid medium flowing through said constricted flow passages; and an outer movable nozzle constituted by a second movable hollow body supported by said base member so as to be movable independently of said first hollow body and to surround said first hollow body and ending with an outlet portion forming a second annular face adjacent the workpiece and defining with the first-mentioned outlet portion an annular, auxiliary nozzle orifice for discharging the liquid medium of said second inlet flow about the liquid medium being discharged through said principal nozzle orifice, said second hollow body being supported by said base member so as to be thrustable outwards thereof to urge said second annular face towards engagement with the workpiece against pressure of the discharged liquid medium flowing between the second annular face and the workpiece.

2. The machine defined in claim 1 wherein the electrode is axially advanced through the workpiece from up to down and said at least one assembly includes the assembly disposed at the lower side of the workpiece.

* * * * *